US011953309B2

(12) United States Patent
Whitaker et al.

(10) Patent No.: US 11,953,309 B2
(45) Date of Patent: Apr. 9, 2024

(54) AUTOMATED NON-CONTACT THICKNESS INSPECTION AND PROJECTION SYSTEM USING COLOR-CODED BASED PATTERNS

(71) Applicant: Lockheed Martin Corporation, Bethesda, MD (US)

(72) Inventors: Shane Whitaker, Aledo, TX (US); Jeffrey Drewett, Kennedale, TX (US); Anthony Mann, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 258 days.

(21) Appl. No.: 17/481,740

(22) Filed: Sep. 22, 2021

(65) Prior Publication Data

US 2023/0090145 A1    Mar. 23, 2023

(51) Int. Cl.
*G01B 11/06* (2006.01)
*B25J 9/16* (2006.01)
*G05D 1/00* (2006.01)
*B05B 13/04* (2006.01)

(52) U.S. Cl.
CPC ......... *G01B 11/0616* (2013.01); *B25J 9/1697* (2013.01); *G05D 1/0088* (2013.01); *B05B 13/0431* (2013.01)

(58) Field of Classification Search
CPC .... G01B 11/0616; G01B 11/06; B25J 9/1697; B25J 9/1679; G05D 1/0088; B05B 13/0431; B05B 12/084; G05B 2219/40298; G05B 2219/40613; G05B 2219/45013
See application file for complete search history.

(56) References Cited

U.S. PATENT DOCUMENTS

| | | | |
|---|---|---|---|
| 5,429,682 A | 7/1995 | Harlow, Jr. et al. | |
| 5,645,884 A | 7/1997 | Harlow, Jr. et al. | |
| 5,757,498 A | 5/1998 | Klein, II et al. | |
| 6,663,918 B2 | 12/2003 | Manning et al. | |
| 7,725,210 B2 | 5/2010 | Hoebel et al. | |
| 8,315,834 B2 | 11/2012 | Gimelfarb et al. | |
| 9,303,983 B2 | 4/2016 | Georgeson et al. | |
| 10,801,098 B2 | 10/2020 | Hanson et al. | |
| 2007/0222460 A1 | 9/2007 | Price et al. | |

(Continued)

FOREIGN PATENT DOCUMENTS

| CN | 110252560 | * 9/2019 | ............. B05B 13/04 |
|---|---|---|---|
| JP | 61126409 | 6/1986 | |

*Primary Examiner* — Michael P LaPage
(74) *Attorney, Agent, or Firm* — Baker Botts L.L.P.

(57) ABSTRACT

In one embodiment, systems and methods include using an inspection and projection system to measure the thickness of a coating and provide visual guidance for secondary operations. The inspection and projection system comprises a robotic arm operable to rotate about a plurality of axes, wherein an end effector is disposed at a distal end of the robotic arm. The inspection and projection system further comprises a linear rail system, wherein the robotic arm is coupled to the linear rail system, and wherein the robotic arm is operable to translate along the linear rail system. The inspection and projection system further comprises a frame, wherein the linear rail system is disposed on top of the frame, and an information handling system coupled to the frame, wherein the information handling system is operable to actuate the robotic arm and the linear rail system.

5 Claims, 4 Drawing Sheets

(56) References Cited

U.S. PATENT DOCUMENTS

| | | | |
|---|---|---|---|
| 2013/0310982 A1* | 11/2013 | Scheurer | B25J 5/007 |
| | | | 700/263 |
| 2015/0212060 A1 | 7/2015 | Van Mechelen et al. | |
| 2018/0172428 A1* | 6/2018 | Bridges | H04N 23/51 |
| 2018/0229371 A1* | 8/2018 | Stadler | G05B 19/402 |
| 2018/0361595 A1* | 12/2018 | Troy | B25J 11/00 |
| 2019/0094149 A1* | 3/2019 | Troy | G01S 17/87 |
| 2019/0204072 A1 | 7/2019 | Adams et al. | |
| 2019/0311555 A1* | 10/2019 | Troy | G07C 5/0808 |
| 2020/0232951 A1* | 7/2020 | Fetzer | B25J 5/00 |
| 2020/0264615 A1* | 8/2020 | Bryner | B25J 9/1617 |
| 2020/0306780 A1 | 10/2020 | Maas et al. | |
| 2021/0073970 A1 | 3/2021 | Afrasiabi et al. | |
| 2022/0161562 A1* | 5/2022 | Murai | B05B 13/0228 |

* cited by examiner

AUTOMATED NON-CONTACT THICKNESS INSPECTION AND PROJECTION SYSTEM USING COLOR-CODED BASED PATTERNS

TECHNICAL FIELD

This disclosure generally relates to surface coatings, and more specifically to an automated non-contact thickness inspection and projection system for coatings applied to an aircraft.

BACKGROUND

Coatings of various types may be applied to surfaces of structures and vehicles to alter or enhance properties of respective surfaces. For example, some coatings may be applied to provide a weather-resistant layer to protect the underlaying structure. As another example, a coating may be applied to reduce vibrations or other deleterious effects during operation of an aircraft.

These coatings may be applied to at least a portion of a surface of an aircraft through a spraying process. There exists a problem in inspecting the thickness of the coating as an operator may manually measure a plurality of individual points.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be re ad to limit or define the scope of the disclosure. Embodiments of the present disclosure and its advantages are best understood by referring to FIGS. 1 through 5, where like numbers are used to indicate like and corresponding parts.

As described, coatings may be applied onto a vehicle, such as an aircraft. It may be difficult to accurately apply the coatings within a determined thickness tolerance. Described herein are various systems and methods that provide a reduction in time and error in measuring the thickness of the coatings by using an inspection and projection system.

Figure 1:
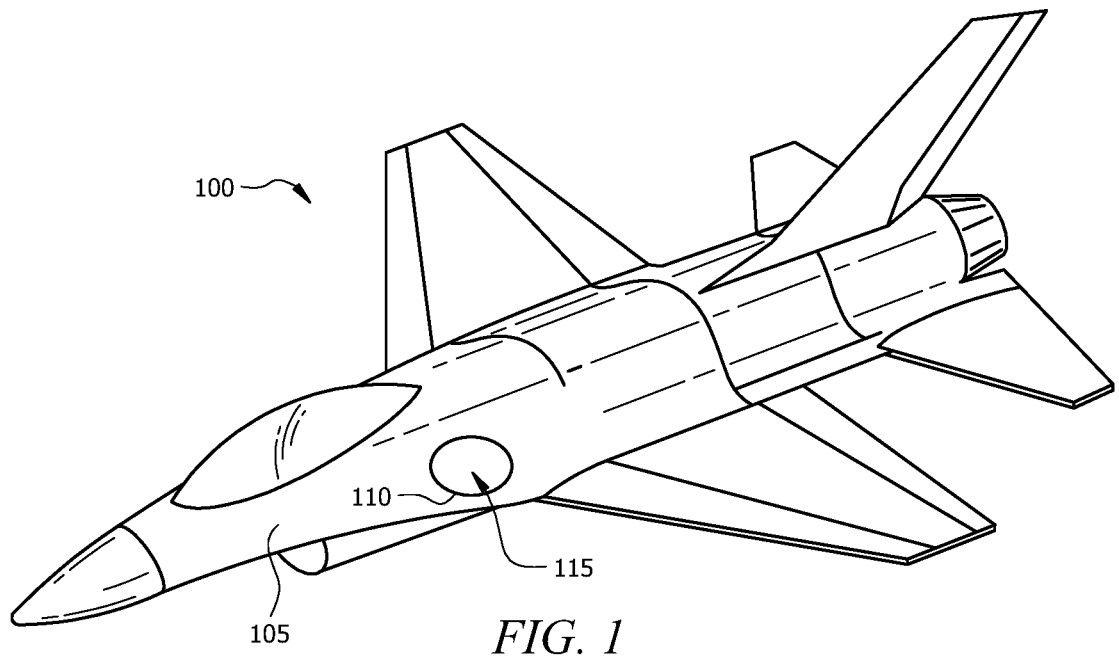
FIG. 1 illustrates an example vehicle onto which a coating is applied, according to certain embodiments.

FIG. 1 illustrates an example vehicle 100 having a surface 105. As illustrated, the vehicle 100 may be a military style aircraft, however, any suitable style of aircraft may be used as the vehicle 100 in the present disclosure. Surface 105 may include a portion 110 onto which a coating 115 may be applied. For example, a coating 115 may be applied to the portion 110 of the surface 105 to protect the surface 105 and vehicle 100 from operational conditions and/or weather, to improve performance, and combinations thereof. Without limitations, the portion 110 wherein the coating 115 is applied may be located about any suitable location along the vehicle 100.

While the example of the vehicle 100 will be used throughout this disclosure as an example application of the methods and systems described herein, any suitable apparatus or structure onto which a surface coating may be applied is also contemplated in this disclosure. For example, vehicle 100 may be any type of vehicle, including an aircraft, a landcraft, a watercraft, a train, a hovercraft, and a helicopter. Further, certain embodiments may be applicable to surface coatings applied to stationary structures, such as buildings or other structures exposed to weather or other operational conditions.

Figure 2:
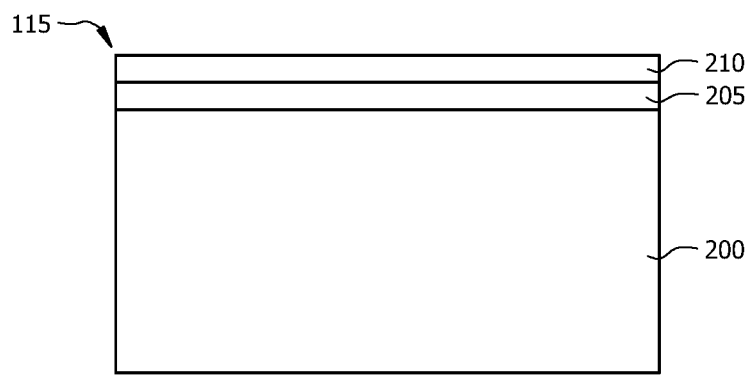
FIG. 2 illustrates a cross-section of a surface of the vehicle in FIG. 1, according to certain embodiments.

FIG. 2 illustrates a cross-section of the portion 110 (referring to FIG. 1) of surface 105 (referring to FIG. 1) of the vehicle 100 (referring to FIG. 1) wherein the coating 115 is applied. The coating 115 may comprise one or more layers, coatings, paints, adhesives, and combinations thereof. As shown in the illustrated example, the portion 110 of the surface 105 may comprise a substrate 200, a first layer 205, and a second layer 210. In some embodiments, substrate 200 may be a base layer of the coating 115 applied to the surface 105 or may be the outer layer of the surface 105. For example, substrate 200 may be the outer metallic or ceramic skin of an aircraft. As another example, substrate 200 may be a coating layer applied to surface 105 prior to applying first layer 205 and/or second layer 210.

In certain embodiments, first layer 205 may be applied on top of substrate 200. In certain embodiments, second layer 210 may be applied on top of first layer 205. In examples, the second layer 210 may be a top coating applied to a car, airplane, etc. The top coating may protect the underlying layers from corrosion, e.g., due to water, chemical/light, or physical damage. In alternate embodiments, the portion 110 of the surface 105 of the vehicle 100 may not comprise the second layer 210. In those embodiments, the first layer 205 performs the operational services previously attributed to second layer 210.

In certain embodiments, coating 115 may include additional layers. For example, further performance coatings, in addition to second layer 210, may be applied to surface 105. Different performance coatings may have different functions that each enhance the operation of vehicle 100. In some embodiments, one or more additional layers may be disposed over surface 105.

In certain embodiments, different portions of surface 105 have applied different performance coatings and other layers. For example, certain portions of surface 105 may have more or fewer coatings and/or layers applied based on the location of that portion of surface 105 and/or the characteristics of the operational environment proximate that portion of surface 105. In this manner, different locations or applications may be configured with varying degrees of coating thickness.

Figure 3:
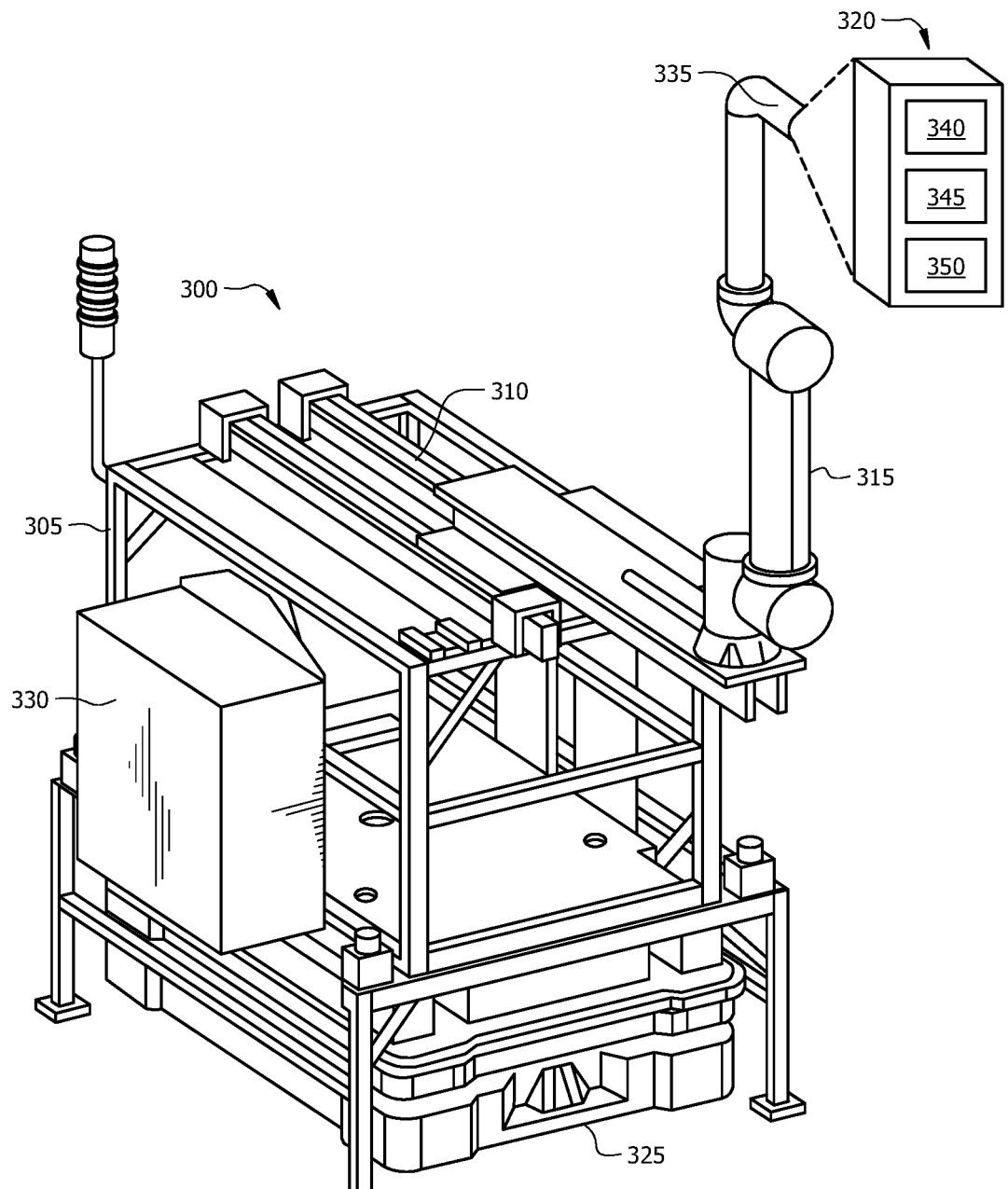
FIG. 3 illustrates an example inspection and projection system, according to certain embodiments.

FIG. 3 illustrates an example inspection and projection system 300. The inspection and projection system 300 may be operable to measure a plurality of points along the portion 110 (referring to FIG. 1) of the surface 105 (referring to FIG. 1) to measure a thickness of the coating 115 (referring to FIG. 1). The inspection and projection system 300 may be further operable to transmit a projection, based on the measurements of thickness, onto the portion 110 of the surface 105, wherein an operator may perform a secondary operation. Without limitations, the secondary operation may comprise of reducing the thickness of the coating 115 at one or more of the plurality of points in accordance with an acceptable range of values, such as through sanding, increasing the thickness of the coating 115 at one or more of the plurality of points in accordance with an acceptable range of values, such as by spraying one or more additional layers of coating 115, and any combination thereof. As illustrated, the inspection and projection system 300 may comprise a frame 305, a linear rail system 310, a robotic arm 315, an end effector 320, an autonomous mobile robot 325, and an information handling system 330.

In one or more embodiments, the frame 305 may be any suitable size, height, shape, and any combinations thereof. In embodiments, the frame 305 may comprise any suitable materials, including, but not limited to, metals, nonmetals, polymers, ceramics, composites, and any combinations thereof. As illustrated, the frame 305 may comprise of individual members fastened together to form a structure operable to support one or more components of the inspection and projection system 300. Each of the one or more components of the inspection and projection system 300 may be disposed at any suitable location in relation to the frame 305. Without limitations, each of the one or more components of the inspection and projection system 300 may be disposed within the frame 305, on top of the frame 305, at a side of the frame 305, underneath the frame 305, and any combinations thereof. In embodiments, each of the one or more components of the inspection and projection system 300 may be coupled to the frame 305 through any suitable means, including, but not limited to, fasteners, threading, welding, brazing, adhesives, and any combinations thereof. As illustrated, the linear rail system 310 may be disposed on top of the frame 305.

In one or more embodiments, the linear rail system 310 may be any suitable size, height, shape, and any combinations thereof. In embodiments, the linear rail system 310 may comprise any suitable materials, including, but not limited to, metals, nonmetals, polymers, ceramics, composites, and any combinations thereof. The linear rail system 310 may be operable to translate along an axis by a distance. For example, an object coupled to the linear rail system 310 may be disposed along the linear rail system 310 at a first position. In this example, the linear rail system 310 may be actuated to translate the object along the axis of the linear rail system 310 to a second position. As illustrated, the robotic arm 315 may be coupled to the linear rail system 310, wherein the robotic arm 315 is operable to translate along the linear rail system 310.

In one or more embodiments, the robotic arm 315 may be any suitable size, height, shape, and any combinations thereof. In embodiments, the robotic arm 315 may comprise any suitable materials, including, but not limited to, metals, nonmetals, polymers, ceramics, composites, and any combinations thereof. The robotic arm 315 may be operable to rotate about a plurality of axes. Without limitations, there may be any suitable number of the plurality of axes for rotation, including from about two to about six. As illustrated, the end effector 320 may be disposed at a distal end 335 of the robotic arm 315. In embodiments, the robotic arm 315 may be actuated to rotate in order to position the end effector 320 relative to an external object.

In one or more embodiments, the end effector 320 may comprise one or more sensors and/or components, such as a terahertz sensor 340, a camera 345, and a projector 350. Without limitations, each of the terahertz sensor 340, camera 345, and projector 350 may b e disposed about any suitable location with respect to each other. For example, as illustrated, the camera 345 may be disposed between the terahertz sensor 340 and the projector 350. In other embodiments, the terahertz sensor 340 may be disposed between the camera 345 and the projector 350, or the projector 350 may be disposed between the terahertz sensor 340 and the camera 345. The terahertz sensor 340 may be operable to transmit and receive signals to measure a thickness of the coating 115 (referring to FIG. 1). In embodiments, the terahertz sensor 340 may operate to transmit signals at a terahertz frequency. During operations, the terahertz sensor 340 may receive signals reflected off of a surface of the coating 115 and off of the surface 105 (referring to FIG. 1) of the vehicle 100 (referring to FIG. 1) upon which the coating 115 is disposed. The camera 345 may be operable to identify the location of the vehicle 100 (for example, an aircraft) relative to the inspection and projection system 300 in order to perform the operations of inspection. In embodiments, this is done by receiving light rays from a direction of the coating 115. The projector 350 may be operable to transmit a projection onto a surface of the coating 115. During operations, each of the terahertz sensor 340, camera 345, and projector 350 may be communicatively coupled to the information handling system 330, wherein the information handling system 330 may be operable to actuate each of the terahertz sensor 340, camera 345, and projector 350.

In one or more embodiments, the information handling system 330 may be coupled to the frame 305, wherein the information handling system 330 may be communicatively coupled to each of the remaining components of the inspection and projection system 300, including the linear rail system 310, the robotic arm 315, and the autonomous mobile robot 325. Information handling system 330 may be any processing device that controls the operations of one or more components of the inspection and projection system 300 and/or produces data. During operations, the information handling system 330 may be operable to receive signals from the terahertz sensor 340 and/or camera 345 for processing, process the received signals from the terahertz sensor 340 as measurements of thickness for the coating 115 (referring to FIG. 1), process the received signals from the camera 345 to produce an image to represent the thickness of the coating 115, configure a projection based on the measurements of thickness and an acceptable range of values, transmit the projection to the projector 350, and any combinations thereof. Information handling system 330 may determine whether a component of the inspection and projection system 300 requires power and/or may initiate the distribution of power to the one or more components. Information handling system 330 may be hard-wired and/or wirelessly connected to linear rail system 310, robotic arm 315, end effector 320, and autonomous mobile robot 325. Information handling system 330 may use one or more elements illustrated further in FIG. 4.

In or more embodiments, the autonomous mobile robot 325 may be any suitable size, height, shape, and any combinations thereof. In embodiments, the autonomous mobile robot 325 may comprise any suitable materials, including, but not limited to, metals, nonmetals, polymers, ceramics, composites, and any combinations thereof. The autonomous mobile robot 325 may be operable to lift and transport the frame 305 from a first location to a second location. Any suitable system may be utilized as the autonomous mobile robot 325 in accordance with the present disclosure.

Figure 4:
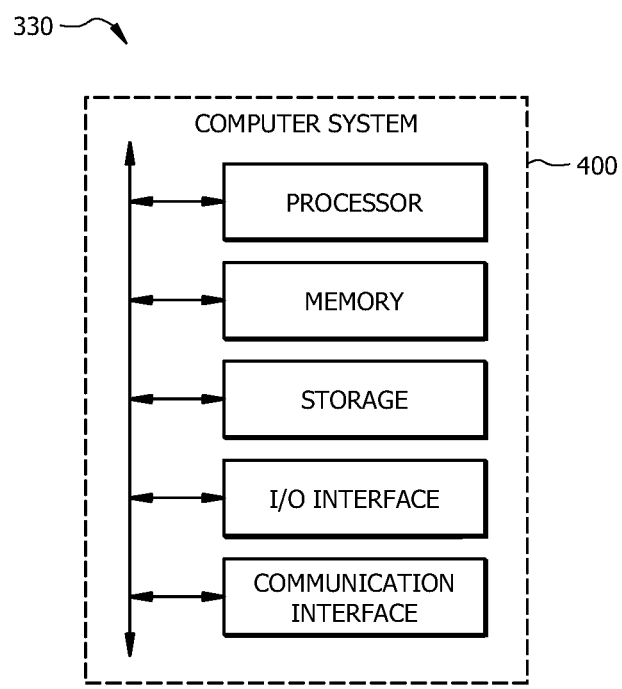
FIG. 4 illustrates an example information handling system of the inspection and projection system in FIG. 3, according to certain embodiments.

FIG. 4 illustrates an example of elements 400 that may be included in information handling system 330, according to certain embodiments. For example, information handling system 330 may include one or more interface(s), processing circuitry, memory(ies), and/or other suitable element(s). Interface receives input, sends output, processes the input and/or output, and/or performs other suitable operation. Interface may comprise hardware and/or software.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory (or memory unit) stores information. Memory may comprise one or more non-transitory, tangible, computer-readable, and/or computer-executable storage media. Examples of memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 5:
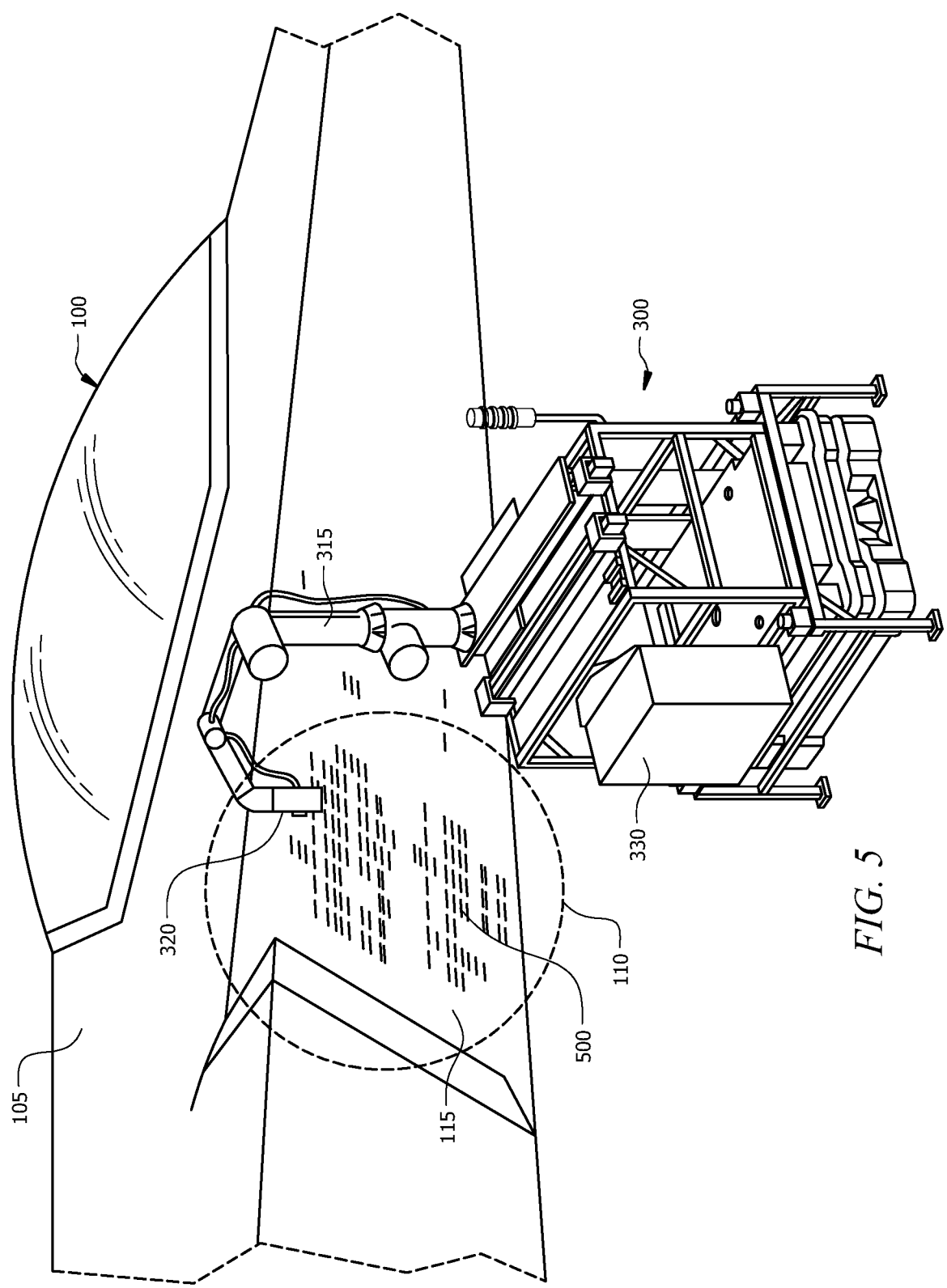
FIG. 5 illustrates the inspection and projection system in FIG. 3 operating in relation to the vehicle in FIG. 1, according to certain embodiments.

FIG. 5 illustrates the example inspection and projection system 300 with the vehicle 100. As illustrated, the inspection and projection system 300 may be disposed near the vehicle 100. In one or more embodiments, the robotic arm 315 may have been actuated to displace the end effector 320 proximate to the portion 110 of the surface 105 of the vehicle 100 wherein the coating 115 is applied. As illustrated, a projection 500 may be transmitted from the projector 350 (referring to FIG. 3) of the end effector 320 to be displayed on the coating 115. The projection 500 may be configured by the information handling system 330 based on the measurements of thickness (e.g., thickness map data) and an acceptable range of values for the thickness of that coating 115 (e.g., a threshold). In embodiments, there may be different values for the acceptable range of values for a given coating. Without limitations, the projection 500 may comprise a display of values of the measurements of thickness, may be color-coded based, at least in part, on a comparison between the measurements of thickness and the acceptable range of values, and any combinations thereof. For example, if the projection 500 is color-coded, the inspection and projection system 300 may display a certain color (e.g., green) at selected points within the portion 110 of the surface 105 on the coating 115 indicating an acceptable measurement of thickness within the acceptable range of values. Further in the example, the inspection and projection system 300 may display a different color (e.g., red) at selected points within the portion 110 of the surface 105 on the coating 115 indicating an unacceptable measurement of thickness outside of the acceptable range of values. An operator may perform a secondary operation to either increase or reduce the thickness of the coating 115 at those selected points based on the acceptable range of values.

With reference to FIGS. 1-5, a method as presented in the present disclosure may be described. The inspection and projection system 300 may be actuated to displace the end effector 320 proximate to the portion 110 of the surface 105 wherein the coating 115 is disposed. In embodiments, the autonomous mobile robot 325 may displace the frame 305 from a first location to a second location, the linear rail system 310 may translate along an axis to displace the robotic arm 315, the robotic arm 315 may rotate about a plurality of axes, and any combinations thereof in order to position the end effector 320. To verify the placement of the end effector 320 in relation to the portion 110 of the surface 105, the camera 345 and projector 350 may be utilized to align the end effector 320. A verification projection may be displayed on the vehicle 100, wherein an operator may determine whether the verification projection aligns with the portion 110 of the surface 105. If the verification projection does not align, the inspection and projection system 300 may be actuated to displace the end effector 320 to another location, and the process may repeat. If there is alignment, the end effector 320 may be actuated to transmit and receive signals in order to measure the thickness of the coating 115 at a plurality of points or locations within the portion 110 of the surface 105. In one or more embodiments, the end effector 320 may operate in any suitable pattern. In embodiments, the information handling system 330 may receive the received signals for processing as measurements of thickness. The information handling system 330 may configure the projection 500 based on the measurements of thickness and the acceptable range of values. The information handling system 330 may further transmit thickness map data to the projector 350, wherein the projector 350 may transmit the projection 500 to be displayed against the coating 115. In further operations, an operator may conduct a secondary operation to either increase or decrease the thickness of the coating 115 at one or more of the plurality of points or locations within the portion 110 of the surface 105 based on the projection 500.

Technical advantages of this disclosure may include one or more of the following. Previous methods provided for manually measuring the thickness of the coating 115. The inspection and projection system 300 described herein may decrease the amount of time required to measure a given area of the surface 105 of the vehicle 100 and may increase the accuracy for the measurements. Further, the inspection and projection system 300 may provide visual guidance for secondary operations related to the coating 115.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An inspection and projection system, comprising:
   a robotic arm operable to rotate about a plurality of axes, wherein an end effector is disposed at a distal end of the robotic arm and wherein the end effector comprises:
      a terahertz sensor configured to transmit and receive signals to measure thickness of a coating;
      a camera configured to identify a location of a surface, relative to the inspection and projection system, in order to perform an inspection; and
      a projector configured to transmit a projection onto a surface of the coating, wherein the projection is color-coded based, at least in part, on a comparison between measurements of thickness and a predetermined range of values;
   a linear rail system, wherein the robotic arm is coupled to the linear rail system, wherein the robotic arm is operable to translate along the linear rail system;
   a frame, wherein the linear rail system is disposed on top of the frame; and
   an information handling system coupled to the frame having a processor and a memory storing instructions that when executed by the processor cause the information handling system to actuate the robotic arm and the linear rail system.

2. The inspection and projection system of claim 1, further comprising an autonomous mobile robot, wherein the autonomous mobile robot is operable to lift and transport the frame from a first location to a second location.

3. The inspection and projection system of claim 2, wherein the memory of the information handling system further stores instructions that when executed by the processor causes the information handling system to actuate the terahertz sensor, the camera, and the projector.

4. The inspection and projection system of claim 2, wherein the terahertz sensor is operable to transmit received signals to the information handling system for processing, wherein the memory of the information handling system further stores instructions that when executed by the processor cause the information handling system to process the received signals as the measurements of thickness, wherein the memory of the information handling system further stores instructions that when executed by the processor cause the information handling system to configure the projection based on the measurements of thickness and the predetermined range of values and to transmit the projection to the projector.

5. The inspection and projection system of claim 4, wherein the projection comprises a display of values of the measurements of thickness.

\* \* \* \* \*